(12) United States Patent
Mortensen (10) Patent No.: US 9,785,444 B2
(45) Date of Patent: Oct. 10, 2017

(54) HARDWARE ACCELERATOR CONFIGURATION BY A TRANSLATION OF CONFIGURATION DATA

(71) Applicant: ANALOG DEVICES GLOBAL, Hamilton (BM)

(72) Inventor: Mikael Mortensen, Kg. Lyngby (DK)

(73) Assignee: ANALOG DEVICES GLOBAL, Hamilton (BM)

( * ) Notice: Subject to any disclaimer, the term of this patent is extended or adjusted under 35 U.S.C. 154(b) by 574 days.

(21) Appl. No.: 13/968,844

(22) Filed: Aug. 16, 2013

(65) Prior Publication Data

US 2015/0052332 A1    Feb. 19, 2015

(51) Int. Cl.
*G06F 9/38* (2006.01)
*G06F 15/78* (2006.01)

(52) U.S. Cl.
CPC .......... *G06F 9/3879* (2013.01); *G06F 9/3877* (2013.01); *G06F 15/7889* (2013.01)

(58) Field of Classification Search
CPC ....................................... G06F 9/3877–9/3881
(Continued)

(56) References Cited

U.S. PATENT DOCUMENTS 5,721,945 A * 2/1998 Mills .................. G06F 9/30145
                                                                 700/2
6,256,724 B1    7/2001 Hocevar et al.
(Continued)

FOREIGN PATENT DOCUMENTS

CN    102171682 A    8/2011
CN    104375972 A    2/2015
(Continued)

OTHER PUBLICATIONS

J. Wassner, et al, "Hardware-Software Codesign of a Tightly-Coupled Coprocessor for Video Content Analysis", IEEE Workshop on Signal Processing Systems (SIPS), Oct. 2010, pp. 87-92.
(Continued)

*Primary Examiner* — Keith Vicary
(74) *Attorney, Agent, or Firm* — Schwegman Lundberg & Woessner, P.A.

(57) ABSTRACT

A microprocessor circuit may include a software programmable microprocessor core and a data memory accessible via a data memory bus. The data memory may include sets of configuration data structured according to respective predetermined data structure specifications for configurable math hardware accelerators, and sets of input data for configurable math hardware accelerators, each configured to apply a predetermined signal processing function to the set of input data according to received configuration data. A configuration controller is coupled to the data memory via the data memory bus and to the configurable math hardware accelerators. The configuration controller may fetch the configuration data for each math hardware accelerator from the data memory and translate the configuration data. The configuration controller may transmit each set of configuration data to the corresponding configurable math hardware accelerator and write the configuration data to configuration registers of the math hardware accelerator.

20 Claims, 4 Drawing Sheets

(58) Field of Classification Search
USPC .................................................. 712/34, 35
See application file for complete search history.

(56) References Cited

U.S. PATENT DOCUMENTS

| | | | |
|---|---|---|---|
| 6,526,430 | B1 | 2/2003 | Hung et al. |
| 6,842,844 | B1* | 1/2005 | Fadavi-Ardekani . H04M 11/062 711/147 |
| 7,228,401 | B2 | 6/2007 | Moyer |
| 7,430,652 | B2 | 9/2008 | Hundley |
| 7,669,037 | B1* | 2/2010 | Schumacher ......... G06F 9/5044 712/34 |
| 2003/0028751 | A1* | 2/2003 | McDonald .......... G06F 15/7864 712/34 |
| 2005/0027965 | A1 | 2/2005 | Yamada et al. |
| 2005/0278502 | A1* | 12/2005 | Hundley ............... G06F 9/4843 712/34 |
| 2006/0179273 | A1 | 8/2006 | Cole et al. |
| 2008/0028187 | A1* | 1/2008 | Casselman ............ G06F 13/409 712/37 |
| 2008/0159528 | A1* | 7/2008 | Feghali ................. G06F 9/3879 380/30 |
| 2009/0193234 | A1* | 7/2009 | Ors ........................ G06F 9/4881 712/220 |

FOREIGN PATENT DOCUMENTS

| | | |
|---|---|---|
| EP | 0 410 778 | 1/1991 |
| EP | 0 992 895 | 4/2000 |
| EP | 1 391 812 | 2/2004 |

OTHER PUBLICATIONS

I. Maalej et al., "Interface Design Approach for System on Chip Based on Configuration", Proceedings of the 2003 International Symposium on Circuits and Systems (ISCAS '03), vol. 5, pp. 93-96, May 2003.

"Chinese Application Serial No. 201410403538.7, Office Action mailed Dec. 23, 2016", 11 pgs.

* cited by examiner

HARDWARE ACCELERATOR CONFIGURATION BY A TRANSLATION OF CONFIGURATION DATA

The present invention relates to a microprocessor circuit comprising a software programmable microprocessor core and a data memory accessible via a data memory bus. The data memory comprises a plurality of sets of configuration data structured in accordance with respective predetermined data structure specifications for a plurality of configurable math hardware accelerators. The data memory further comprises respective sets of input data for the plurality of configurable math hardware accelerators where each of the configurable math hardware accelerators is configured to apply a predetermined signal processing function to the set of input data in accordance with a received set of the register level configuration data. A configuration controller is coupled to the data memory via the data memory bus and to the plurality of configurable math hardware accelerators. The configuration controller being configured to fetching the set of configuration data for each math hardware accelerator from a predetermined address space of the data memory through the data memory bus and translating the plurality of sets of configuration data to respective sets of register level configuration data for the plurality of configurable math hardware accelerators in accordance with the respective predetermined data structure specifications. The configuration controller being further configured to transmitting each set of register level configuration data to the corresponding configurable math hardware accelerator and writing each set of the register level configuration data to one or more configuration registers of the corresponding configurable math hardware accelerator.

BACKGROUND OF THE INVENTION

The present invention relates to a method of configuring a plurality of configurable math hardware accelerators of an integrated microprocessor circuit via a configuration controller and a corresponding microprocessor circuit comprising the configuration controller. The configuration controller may be operating as interface between a Digital Signal Processor (DSP) core or a microprocessor core and the plurality of configurable math hardware accelerators. The latter accelerators or computing units are specialized mathematical hardware computational units configured to compute certain types of signal processing functions that involve arithmetic or mathematical calculations. The mathematical calculations are typically associated with complex numerical computations of advanced digital signal processing algorithms. Exemplary signal processing functions include FFT, iFFT, vector*matrix multiplications, FIR/IIR filter multiplications, logarithms, square roots, etc. Existing math hardware accelerators are often interfaced to a microprocessor core by memory mapping into a main data memory of the microprocessor circuit or alternatively interfaced to one or more I/O ports of the microprocessor circuit. For a large number of microprocessor circuits and associated systems these prior art interface methodologies to the math hardware accelerators are unsatisfactory solutions because of computational overhead of maintaining a memory mapped or I/O port model. This computational overhead and power overhead is incurred to the DSP or microprocessor core by continuously updating content of the respective configuration registers of the math hardware accelerator(s). On the other hand, it is highly desirable to provide each math hardware accelerator with a relatively flexible structure or topology via numerous programmable parameters and corresponding configuration registers such that functionality can be tailored to requirements of a specific type of signal processing application. The ability to tailor the functionality of the math hardware accelerator to specific applications allows use or re-use of the math hardware accelerator in a broad range of applications such that individual demands from a diversified customer base can be served.

U.S. Pat. No. 6,256,724 B1 discloses a microprocessor with a DSP core and a re-configurable hardware coprocessor. The re-configurable hardware co-processor may be adapted to calculate various mathematical functions based on a set of functional units like multipliers and adders. The DSP core loads data and coefficients to be used by the re-configurable hardware coprocessor into a data memory and coefficient memory, respectively. This loading of data may be performed directly by the DSP core or performed indirectly via control of a DMA circuit. The data memory and coefficient memory are coupled to a common data bus used by the DSP core and the hardware coprocessor. The DSP core sends a command to the hardware co-processor about selection of a desired signal processing algorithm via a command to the command memory of the hardware coprocessor.

"INTERFACE DESIGN APPROACH FOR SYSTEM ON CHIP BASED ON CONFIGURATION" ISCAS Paper, Issam MAALEJ et al. This paper discloses a communication interface between a RISC processor and a hardware accelerator mounted on a SOC chip. The hardware accelerator can be adapted for DCT, FIR etc. computations. The communication interface reads all data to be processed by the hardware accelerator from the RISC core. The data are written to the selected hardware accelerator when that latter is ready by start command issued by the communication interface. The communication interface reads the result of the hardware accelerator computations when ready and writes the results to the RISC core.

U.S. 2005/0027965 A1 discloses a microprocessor with a CPU, a Floating Point Unit (FPU) and a byte-code accelerator (BCA). The BCA translates intermediate byte code generated by JAVA into a native format of the microprocessor and FPU.

SUMMARY OF INVENTION

A first aspect of the invention relates to a microprocessor circuit comprising a software programmable microprocessor core and a data memory accessible via a data memory bus. The data memory comprises or stores a plurality of sets of configuration data structured in accordance with respective predetermined data structure specifications for a plurality of configurable math hardware accelerators. The data memory further comprises respective sets of input data for the plurality of configurable math hardware accelerators and each of the configurable math hardware accelerators is configured to apply a predetermined signal processing function to the set of input data in accordance with a received set of the register level configuration data. A configuration controller is coupled to the data memory via the data memory bus and to the plurality of configurable math hardware accelerators for example through a separate control bus. The configuration controller being configured to:

fetching the set of configuration data for each math hardware accelerator from a predetermined address space of the data memory through the data memory bus, translating the plurality of sets of configuration data to respective sets of register level configuration data for the plurality of configurable math hardware accelerators in accordance with the respective predetermined data structure specifications, transmitting each set of register level configuration data to the corresponding configurable math hardware accelerator, writing each set of the register level configuration data to one or more configuration registers of the corresponding configurable math hardware accelerator.

The present configuration controller and the corresponding methodology of configuring configurable math hardware accelerators solve the previously mentioned problems related to the computational overhead and power overhead incurred to the microprocessor core by continuously having to update the content of the numerous configuration registers of the configurable math hardware accelerators. The present configuration controller is capable of off-loading the microprocessor core from numerous repetitive operations involving reading and translating often highly diverse sets of configuration data for the configurable math hardware accelerators into the corresponding sets of register level configuration data that comply with the relevant register architecture of the configurable math hardware accelerator in question. Likewise, the configuration controller also writes the generated sets of register level configuration data to the appropriate configuration registers of each of the configurable math hardware accelerators to further reduce the computational burden on the microprocessor core. Hence, the microprocessor core is relieved from regularly updating the content of the respective configuration registers of the math hardware accelerator(s) in response to changes of the configuration of the hardware accelerator. Despite this off-loading of the microprocessor core, configuration flexibility of the plurality of configurable math hardware accelerators is maintained allowing the relevant signal processing functions to be accurately tailored to performance metrics of any particular application. The skilled person will appreciate that the present invention is particularly helpful for application on complex System-on-chip (SOC) circuit designs that may include a large number of configurable math hardware accelerators, for example between 2 and 10, for speeding-up computation of a large variety of complex signal processing algorithms or functions. The skilled person will understand that the term "microprocessor" of the software programmable microprocessor core also includes a Digital Signal Processor (DSP) or a microprocessor with certain Digital Signal Processing function enhancements.

The configuration controller may be physically placed between the configurable math hardware accelerators and the data memory of the microprocessor circuit. The configuration controller is capable of understanding the predetermined data structure specifications which preferably comprises predefined high level language data structures. The high level language data structures may comprise record structures such as C-style "struct", "array", or "list". A particularly useful embodiment of the present configuration controller comprises a pointer register configured to hold a data pointer indicating the respective predetermined address spaces of the sets of configuration data in the data memory. The microprocessor core writes a data pointer to this pointer register of the configuration accelerator for each set of the configuration data indicating where the relevant set of configuration data is located. After receiving said data pointer the configuration controller fetches or reads the selected configuration data, such as various configuration parameters, from the data memory through the data memory bus coupled to the configuration controller. The predetermined data structure specification and the register architecture of the each of math hardware accelerators have prefer-
ably been hardcoded into the configuration controller such that the configuration controller understands these. The configuration controller may for example comprise respective register maps of the one or more configuration registers of the plurality of configurable math hardware accelerators. This understanding enables the configuration controller to translate each set of configuration data into the corresponding set of register level configuration data that may include a register address and register data for each of the one or more configuration registers of each of the configurable math hardware accelerators. The configuration controller is therefore capable of copying the register level configuration data into the appropriate configuration register(s) of the math hardware accelerator in the order specified by the predetermined data structure specification, e.g. a high level language record structure.

Hence, the present configuration controller can be viewed as an interface block between the software programmer, writing source program code at a high abstraction level, and architectural details of each of the configurable math hardware accelerators configured to execute the signal processing functions specified by the developed program code. The software programmer is only required to understand ordinary types of high level language record structures to program and exploit the computing power of the configurable math hardware accelerators. This feature relieves the software programmer from worrying about and handling the actual configuration details, such as configuration register content and addresses, of the math hardware accelerator(s). The configuration preferably comprises a digital state machine comprising sequential and combinatorial digital logic circuitry configured to perform the above-discussed functions and operations.

The presence of the present configuration controller or accelerator leads to several other advantages from a microprocessor system's perspective. Savings in the computational loading or cycles of the programmable microprocessor core is one significant advantage brought about because the programmable microprocessor core is relieved from fetching or reading the plurality of sets of configuration data for the math hardware accelerators from the data memory and subsequently translate and write each of these translated sets to the appropriate configuration registers of each of the math hardware accelerators.

The configuration controller is furthermore preferably configured to directly fetch and load each set of configuration data from the predetermined addresses space of the data memory in response to receipt of the previously discussed data pointer without intervention of the software programmable microprocessor core. This feature leads to significant savings in the power consumption of the microprocessor circuit because the sets of configuration data bypasses internal data registers and internal data busses etc. of the software programmable microprocessor core which typically consume significant power. As the configuration controller may be configured to utilizing spare memory cycles of the software programmable microprocessor core to read and write the relevant configuration data the computation burden on the software programmable microprocessor core will be largely negligible.

The configuration controller preferably comprises a dedicated control port and control bus coupled to a mating control port of each of the math hardware accelerators to transfer the sets of register level configuration data thereto.

The fetching or loading of the respective sets of input data to the configurable math hardware accelerators for signal processing may be carried out by different mechanisms. In one embodiment of the invention, one or more of the configurable math hardware accelerators is/are configured to fetch the set of input data from the data memory via the data memory bus and write the set of input data to an input data register space, such as a register file or RAM, of the configurable math hardware accelerator. In addition, the one or more of the configurable math hardware accelerators may be configured to writing computed sets of output data to predetermined address spaces, or output buffers, of the data memory. This embodiment requires the relevant configurable math hardware accelerators to include a memory bus interface but allows rapid fetching of large sets of input data from the data memory with low power consumption. This is particular relevant for math hardware accelerators that typically operates on such large input data sets for example FFT or iFFT hardware accelerators that may use input data sets with 1024 input samples or more.

According to an alternative embodiment, the configuration controller itself is configured to fetch the set of input data for the one or more math hardware accelerators from the data memory via the data memory bus and write the set of input data to the input data register space of the configurable math hardware accelerator. In this embodiment the configuration controller may comprise the previously discussed control port and control bus such that the set of input data is written to the input data register space of the configurable math hardware accelerator through the control bus like the set of register level configuration data. Hence, the configuration controller may load the respective sets of input data into the configurable math hardware accelerators lacking the previously discussed data memory bus.

The respective signal processing functions computed by the plurality of configurable math hardware accelerators may be functions that involve calculation of computationally hard arithmetic functions. Typical microprocessor datapaths and typical DSP datapaths are often slow and inefficient in calculating such computationally hard arithmetic functions which include logarithms, square roots, divisions etc. Other types of signal processing functions may simply comprise data flows or data manipulations that do not fit well to the capabilities of typical microprocessor or DSP datapaths. In one embodiment of the invention, at least one of the plurality of configurable math hardware accelerators is configured to compute a signal processing function selected from a group of {FFT, inverse FFT (iFFT), vector*matrix multiplication, FIR filter, IIR filter, logarithm, square root}.

A second aspect of the invention relates to an integrated semiconductor die or chip comprising a microprocessor circuit according to any of the above described embodiments thereof. The integrated semiconductor die may be fabricated in suitable digital semiconductor processes such as 0.35 μm, 0.18 μm or 0.065 μm CMOS. The data memory may comprise well-known memory types such as RAM, EEPROM or flash memory or any combination of these memory types. In some embodiments of the invention, the data memory is accessible to at least some of plurality of configurable math hardware accelerators via the previously discussed data memory bus allowing these to fetch the respective sets of input data directly from the data memory without requiring assistance from the configuration controller, microprocessor core or a Direct Memory Access (DMA) controller.

A third aspect of the invention relates to a method of configuring a plurality of configurable math hardware accelerators of an integrated microprocessor circuit via a configuration controller, comprising steps of:

a) writing, to predetermined address spaces of a data memory of the integrated microprocessor circuit, a plurality of sets of configuration data structured in accordance with respective predetermined data structure specifications for a plurality of configurable math hardware accelerators, b) fetching, by the configuration controller, a first set of configuration data for a first configurable math hardware accelerator from the predetermined address space of the data memory, c) translating the first set of configuration data to a first set of register level configuration data for the first configurable math hardware accelerator in accordance with the corresponding predetermined data structure specification, d) transmitting, by the configuration controller, the first set of register level configuration data to the first configurable math hardware accelerator, e) writing the first set of register level configuration data to one or more configuration registers of the first configurable math hardware accelerator for storage therein, f) repeating steps b) to e) for each residual set of configuration data for each residual configurable math hardware accelerator.

One embodiment of the methodology of configuring the plurality of configurable math hardware accelerators comprises a step of:

g) writing a data pointer, indicating the predetermined address space of the first set of configuration data in the data memory, by microprocessor core to a pointer register of the configuration controller. This embodiment was discussed in detail above.

The methodology of configuring the plurality of configurable math hardware accelerators may comprise additional steps of:

h) fetching the set of input data from the data memory by at least one of the configurable math hardware accelerators via the data memory bus, i) writing the set of input data to an input data register space of the configurable math hardware accelerator.

Yet another embodiment of the present methodology comprises further steps of, before execution of step a):

compiling, in an external computer, source code comprising high level language declarations of the predetermined data structure specifications to generate the multiple sets of configuration data and loading the multiple sets of configuration data into to the respective predetermined address spaces of the data memory of the integrated microprocessor circuit. The skilled person will understand that the sets of configuration data may be written by the external computer to the microprocessor core via a suitable data communications interface for example a serial data interface such as I$^2$C, SPI etc. The microprocessor core is configured to subsequently write the received sets of configuration data to the predetermined address spaces of the data memory via the data memory bus of the microprocessor circuit. Alternatively, the external computer may write the sets of configuration data directly to the respective predetermined address spaces of the data memory via the data communications interface if the latter is coupled to the data memory bus. The source code may be written in various high level computer programming languages for example a C dialect such as C++.

To process the set of input data and generate corresponding output data, the method preferably comprises a further step of:

executing a predetermined signal processing function on the first set of input data by the first configurable math hardware accelerator in accordance with the received set of register level configuration data. As mentioned above, the output data may be written to an output buffer located at a predetermined address space of the data memory. The microprocessor core is thereby able to access and utilize the output data in accordance with the executable program instructions of the relevant application program or programs. The skilled person will appreciate that a single application program may invoke one or numerous configurable math hardware accelerators for manipulation of certain collection of input data. Furthermore, the configurable math hardware accelerators may be configured to operate in cascade by the microprocessor core such that the set of output data of a first configurable math hardware accelerator forms the set of input data for second configurable math hardware accelerator and so on. Hence, complex digital signal processing algorithms involving numerous separate signal processing functions can be built by activating the configurable math hardware accelerators in particular sequence.

BRIEF DESCRIPTION OF THE DRAWINGS

Preferred embodiments of the invention will be described in more detail in connection with the append drawings in which.

DESCRIPTION OF PREFERRED EMBODIMENTS

Figure 1:
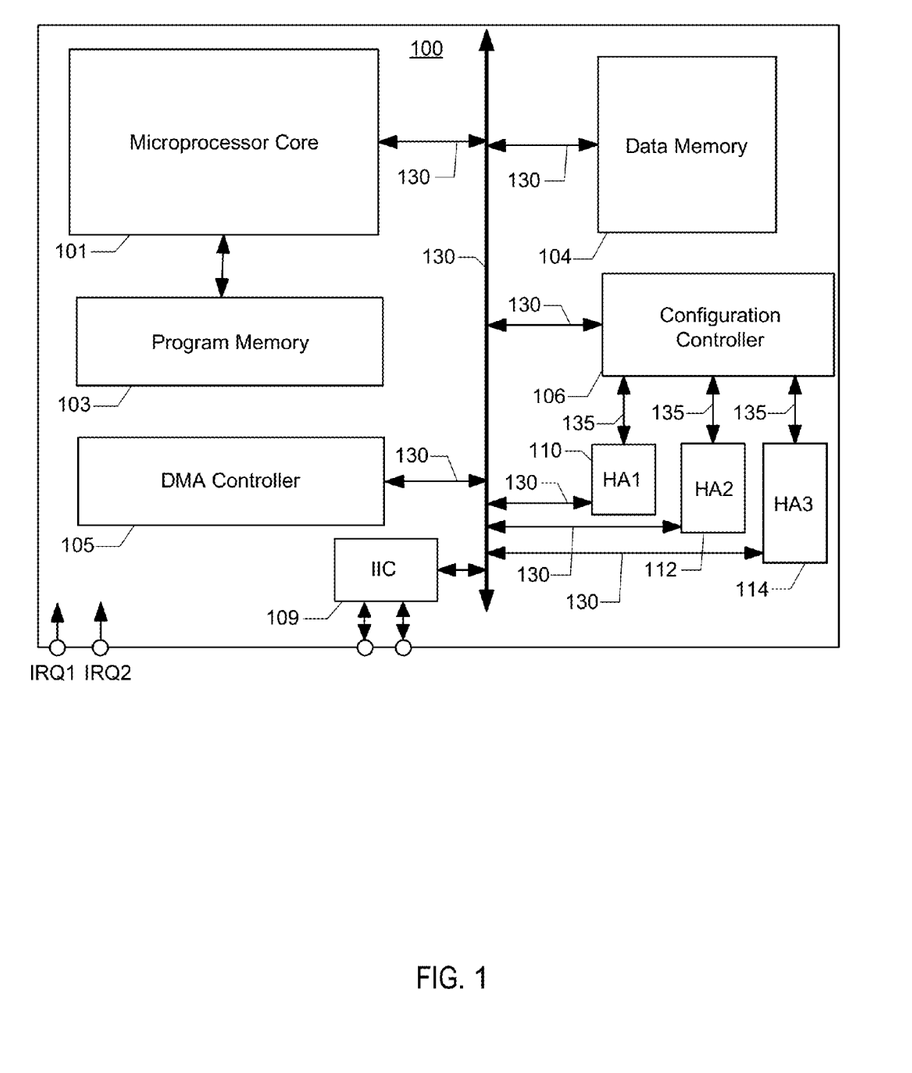
FIG. 1 is a simplified schematic block diagram of a microprocessor circuit comprising a configuration controller coupled to a plurality of configurable math hardware accelerators in accordance with a preferred embodiment of the present invention.

FIG. 1 is a simplified schematic block diagram of a microprocessor circuit 100 comprising a software programmable microprocessor core 101 and a configuration controller 106 in accordance with a preferred embodiment of the present invention.

The microprocessor circuit 100 may be shaped and sized for integration on a printed circuit board of a piece of electronic equipment such as a portable communication terminal such as a tablet, smartphone, mobile phone etc. The microprocessor circuit 100 may be fabricated on a single semiconductor die fabricated in suitable digital semiconductor processes such as 0.35 µm, 0.18 µm or 0.065 µm CMOS. The microprocessor core 101 is coupled to a data memory 104 via a data memory bus 130. The data memory bus 130 may for example have a width of 32 or 64 bits in the present embodiment of the invention, but the skilled person will appreciate that other embodiments may possess different bit widths such as 8, 16 and 128. The data memory 104 may be integrated with the microprocessor core 101 on a common semiconductor die or substrate as schematically indicated on the drawing. Alternatively, the data memory 104 may be arranged on a separate dedicated memory chip accessible to the microprocessor circuit 100 via a suitable external memory interface or implemented as a combination of both, i.e. both on-chip and external (off-chip) data memory. The data memory 104 may for example comprise RAM, EEPROM and flash memory or any combination of these memory types.

The software programmable microprocessor core 101 or microprocessor core may comprise a standard ARM Cortex-M4 processor core available from ARM Holdings or any other software programmable proprietary or standard microprocessor and/or DSP core. The microprocessor circuit 100 comprises a program memory 103 which comprises various types of RAM memory for storage of various types of application programs. Each of the application programs comprises a set of executable program instructions stored in the program memory 103 for loading and execution on the microprocessor core 101.

The microprocessor circuit 100 comprises three integrated and configurable math hardware accelerators HA1-3 (110, 112 and 114, respectively) which each comprises hard-wired digital logic configured to efficiently compute a specific math function or functions of a predetermined signal processing function. Exemplary math functions that may be supported by the configurable math hardware accelerators HA1-3 include FFT and inverse FFT multiplications, vector to vector and vector to matrix multiplications, FIR/IIR filter multiplications, square root and logarithm calculations etc. The configurable property of each of the math hardware accelerators HA1-3 is provided via one or more writable configuration registers that holds a set of register level configuration data. The writable configuration registers allow the characteristics of the associated signal processing function to be tailored to a target application. Hence, the first configurable math hardware accelerator HA1 may be configured to perform consecutive FFT transforms of consecutive blocks of audio input data or samples stored in a particular memory space of the data memory 104. The writable configuration registers of the first configurable math hardware accelerator HA1 may be used to specify characteristics of the FFT like a size of the FFT, a format of the audio input data, e.g. integer or floating point, a word length of the audio input data, e.g. 8, 16 or 24 bits, a pointer address to the data memory space holding the audio input samples, a pointer address to an output buffer of a data memory space storing the transform values etc. The skilled person will appreciate that fewer or additional configurable math hardware accelerators may be utilized in other embodiments of the invention. The skilled person will likewise understand that many different types of math functions may be computed by the configurable math hardware accelerators, in particular math functions that would consume large computing resources of the data path of the specific type of microprocessor core 101.

A first data port or interface of the configuration controller 106 is coupled to the data memory 104 via the data memory bus 130 such that the configuration controller is capable of accessing and reading data content of the data memory 104, in particular the above discussed set of configuration data. The configuration controller 106 is furthermore coupled to the three configurable math hardware accelerators HA1-3 via dedicated data busses or links 135 such that the respective sets of register level configuration data determined by the configuration controller 106 can be written by the configuration controller 106 to the configurable math hardware accelerators HA1-3 as explained in additional detail below.

The present embodiment of the microprocessor circuit 100 comprises an I2C serial data communication interface or port 109 and other embodiments may naturally comprise additional serial data interfaces and/or other types of wired or wireless data interfaces like SPI etc. The I2C serial data communication interface is preferably connected to the microprocessor core 101 such that application program instructions can be loaded into the program memory 103 from an external computer. Likewise, various types of data variables and constants, in particular multiple sets of configuration data for the three configurable math hardware accelerators HA1-3, may be loaded into the data memory 104 from the external computer via the I2C serial data communication interface 109 as discussed in further detail below. The microprocessor circuit 100 comprises an optional DMA controller 105 coupled to the data memory bus 130 allowing the DMA controller 105 to efficiently move large consecutive blocks of input and output data between the data memory and other circuit blocks of the microprocessor circuit 100.

The skilled person will understand that the microprocessor circuit 100 typically will comprise a number of additional circuit blocks such as clock circuits, power control circuits, bus controllers, interrupt controllers that are connected to the schematically illustrated externally accessible interrupt pins or pads IRQ1 and IRQ2 and dedicated digital audio I/O ports such as $I^2S$ or SLIMbus based audio ports.

Prior to operation of the microprocessor circuit 100, the previously discussed three sets of configuration data are loaded into to respective predetermined address spaces of the data memory 104. The arrangement of the sets of configuration data is discussed in further detail below in connection with FIG. 2. The sets of configuration data may be written by an external computer to the microprocessor core 101 via the $I^2C$ serial data communication interface 109 and the microprocessor core 101 configured to write the received configuration data to the predetermined address spaces of the data memory 104 via the data memory bus 130. Alternatively, the external computer may write the configuration data directly to the predetermined address spaces of the data memory 104 via the $I^2C$ serial data communication interface 109 if the latter is coupled to the data memory bus as illustrated. The three sets of configuration data are generated in the external or host computer by compiling a source code file, preferably written in a high-level language such as a C dialect for example C++, comprising high level language declarations of certain predetermined data structure specifications as explained in further detail below. The outcome of the compilation process on the host computer is three sets of configuration data that are structured in accordance with the respective predetermined data structure specifications that are understood by the configuration controller 106.

The microprocessor core 101 is aware of the address or location of the data memory address space which holds the first set of configuration data and proceeds by writing a data pointer, indicating the location of this predetermined address space, e.g. simply a start address of the first set of configuration data, to a pointer register (not shown) of the configuration controller 106. The configuration controller 106 now proceeds by fetching the first set of configuration data for the first configurable math hardware accelerator HA1 from the pointer designated address space or range of the data memory 104 via the data memory bus 130. The configuration controller 106 preferably fetches the first set of configuration data from the data memory 104 without invoking or activating the microprocessor core 101, i.e. a direct fetching of the first set of configuration data. This direct fetching of the set of configuration data from the data memory 104 is advantageous because direct fetching eliminates data processing within the typically power consuming internal registers, data busses, I/O ports etc. of the microprocessor core 101. The configuration controller 106 proceeds by translating the first set of configuration data to the first set of register level configuration data for the first configurable math hardware accelerator in accordance with the predetermined data structure specification. In this manner, the first set of register level configuration data generated by the configuration controller 106 fits the register model or architecture of the first configurable math hardware accelerator HA1. The details of this translation process are explained in further detail below in connection with the schematic diagram of the configuration controller 106.

In a next step, the configuration controller 106 transmits the first set of register level configuration data to the first configurable math hardware accelerator HA1 via the dedicated data bus 135. The configuration controller 106 also data writes the first set of register level configuration data to the configuration registers of the first configurable math hardware accelerator HA1 for storage therein. The configuration registers of the first configurable math hardware accelerator HA1 may comprise various types of writable volatile data memory such as register files or RAM cells. The skilled person will appreciate that corresponding process steps preferably are executed for the residual sets of configuration data for the residual configurable math hardware accelerators HA2 and HA3 such that these are appropriately configured with respective sets of register level configuration data prior to being activated by the microprocessor core. Hence, the exact order of configuration of the configurable math hardware accelerator HA1-3 is unimportant in many applications provided that each configurable math hardware accelerator is appropriately configured before execution of the associated signal processing function by the main application program executed on the microprocessor core.

Once the configurable math hardware accelerator e.g. HA 1 is appropriately configured, the appropriate set of input data must be loaded into the accelerator before the signal processing function of the hardware accelerator can be applied to these input data. Several data loading mechanisms may be utilized to load the set of input data into the hardware accelerator. In one embodiment, the configuration controller 106 fetches the set of input data from the data memory via its connection to the data memory bus 130 and writes the acquired set of input data, via the dedicated data link 135, to the appropriate input data register space or input data buffer of the hardware accelerator. According to an alternative embodiment, the hardware accelerator fetches the set of input data from the data memory via its own connection to the data memory bus 130 and writes the set of input data to the appropriate register space of the hardware accelerator. According to yet another embodiment, the DMA controller 105 is configured to fetch the set of input data from the data memory and writes the set of input data to the appropriate input data register space of the hardware accelerator. In the latter embodiment, the microprocessor core may be configured to initialize the DMA controller 105 by indicating the appropriate data memory address space holding the set of input data and indicating the input data register space or address space of the hardware accelerator. The skilled person will appreciate that use of the DMA controller 105 for input data transfer is particularly well-suited when the input data comprises large blocks of consecutive data such as the above discussed blocks of audio input data or samples for FFT analysis where the block of audio data may comprise between 512 and 4096 consecutive audio signal samples.

The application of the predetermined signal processing function to the set of input data will normally generate a certain amount of output data, i.e. FFT bin values, cepstrum coefficients, filtered audio samples etc. that are temporary stored in an output data register space of the configurable math hardware accelerator e.g. HA 1. These output data may be written back to a predetermined address space of the data memory 104 for storage by anyone of the data transfer mechanisms outlined above in respect of the set of input data. The application program(s) executed on the microprocessor core 101 is able to access these output data in the data memory and process these in accordance with the relevant program routines of the application program(s).

The skilled person will appreciate that the configuration controller 106 is capable of off-loading the microprocessor core 101 from the numerous repetitive operations involving reading and translating the diverse sets of configuration data for the configurable math hardware accelerators HA1-3 into the corresponding sets of register level configuration data. Likewise, the configuration controller also off-loads the microprocessor core 101 from writing the generated sets of register level configuration data to the correct configuration registers of the configurable math hardware accelerators. These tasks of dealing with the details of the architecture of the configuration registers are instead handled by the configuration controller 106. In this way, after having written appropriate data pointers to configurable math hardware accelerators the microprocessor core 101 simply awaits availability of the output data in the output data buffer of the data memory 104 generated by execution of the signal processing function in question by the configurable math hardware accelerator. A datapath of the microprocessor core 101 may be executing other operations, including mathematical operations, while awaiting the output data. Hence, the present invention may be exploiting parallelism in the operation of the datapath of the microprocessor core and the configurable math hardware accelerators.

Figure 2:
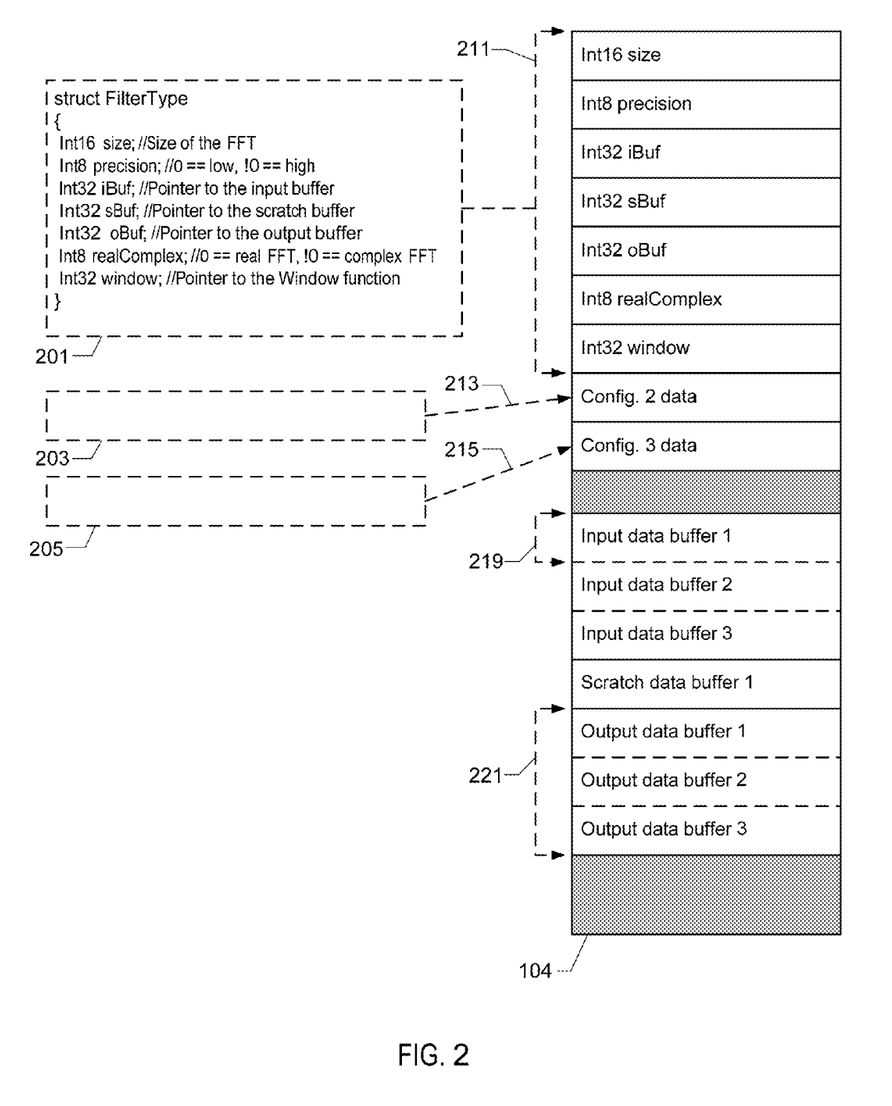
FIG. 2 is schematic illustration of the data content and structure of a data memory address space of a data memory of the microprocessor circuit.

FIG. 2 is schematic illustration of the data content and structure of a data memory address space of the data memory 104 of the microprocessor circuit 100. The dotted box 201 comprises an exemplary predetermined data structure declaration or specification that determines the content and structure of the previously discussed first set of configuration data for the configurable math hardware accelerator HA1. The skilled person will appreciate that the exemplary data structure declaration 201 is similar to a typical C type data structure declaration. However, other high level programming languages may be used instead for the data structure declaration 201 in accordance with the particular type of programming language selected for writing the previously discussed application program for the microprocessor circuit 100. Corresponding data structure declarations or specifications 203, 205 are indicated for the previously discussed second and third sets of configuration data for the configurable math hardware accelerators HA2-3, respectively.

As mentioned above, the first configurable math hardware accelerator HA1 preferably comprises a dedicated hardware implemented FFT accelerator in which certain details of the FFT algorithm are programmable or configurable via the first set of configuration data. The skilled person will understand that the depicted type of configuration data of the first configurable math hardware accelerator HA1 are exemplary only and other embodiments may use fewer, additional or different types of configuration data. A first address space 211 of the data memory holds a number of different configuration constant or variables: Int16 size; Int8 precision; Int32 iBuf; Int32 sBuf; Int32 oBuf; Int8 realComplex; and Int32 window. These configuration constant or variables configures the FFT processing function of the first configurable math hardware accelerator HA1. The variable Int16 is a positive integer number with a 16 bit word length that defines a size of the FFT function, i.e. the number of input data samples to process per FFT. The variable Int8 precision is a positive integer number with 8 bits word length that defines a precision of the FFT function. The variable Int32 iBuf is a 32 bit address or pointer indicating the start address in the data memory of the set of input data or audio input samples for the FFT function. The variable Int32 sBuf is a 32 bit address indicating the start address in the data memory for a scratch memory space that can be used by the FFT function for temporary storage of intermediate FFT results. The variable Int32 oBuf is a 32 bit start address in the data memory 104 of the output data buffer holding the set of output data of the FFT function. The variable Int8 realComplex indicates whether the input data held in the data memory address space indicated by the Int32 iBuf are real, such as audio signal samples, or complex such that the configuration of the FFT operation can account for this. Finally, the variable Int32 window is a 32 bit address or pointer indicating the start address in the data memory of the window coefficients of the window to be applied to the set of input data. Hence, the programmer may select a preferred type of window function for example a custom or proprietary window function by loading the appropriate window coefficients into the data memory space, schematically indicated by legend FFT Window, allocated therefor in the first address space 211 of the data memory 104. The skilled person will understand that the data memory 104 holds corresponding second and third address spaces 213, 215 each holding or storing a number of different configuration constants or variables associated with the residual data structure declarations 203, 205 as schematically indicated by labels Config. 2 data and Config. 3 data.

The data memory 104 furthermore comprises a fourth memory/address space 219 holding the previously discussed first set of input data for the first configurable math hardware accelerator HA1 and additional memory spaces holding the second and third sets of input data for the second and third configurable math hardware accelerators HA2-3, respectively. Finally, the data memory 104 comprises a fifth memory/address space 221 holding the previously discussed respective sets of output data for the configurable math hardware accelerators HA1-3, respectively.

Figure 3:
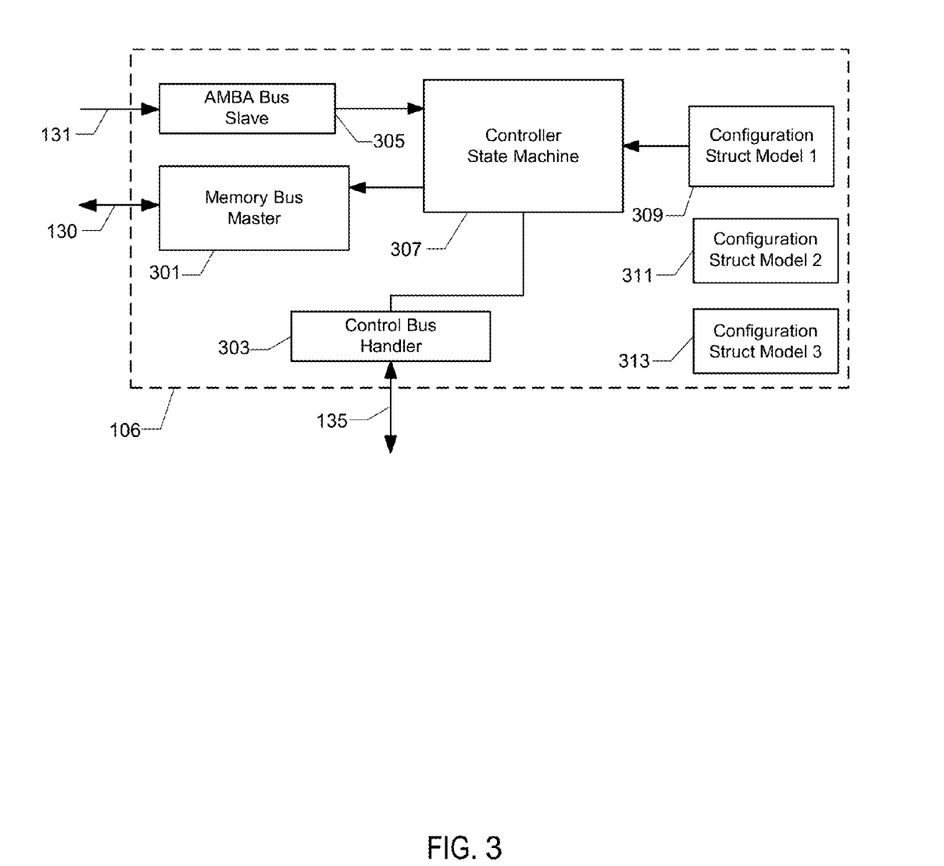
FIG. 3 is a simplified schematic block diagram of a preferred embodiment of the configuration controller.

FIG. 3 is a simplified schematic block diagram of a preferred embodiment of the configuration controller 106. As mentioned above, the configuration controller 106 is configured to translate or convert the first set of configuration data into the corresponding set of register level configuration data for the first configurable math hardware accelerator 110 in accordance with the predetermined data structure specification. In this manner, the first set of register level configuration data generated by the configuration controller 106 fits the register model or architecture of the first configurable math hardware accelerator HA1. These operations are carried out under control of the controller state machine 307 of the configuration controller 106. The controller state machine 307 is preferably designed by an appropriately configured collection of sequential and combinatorial digital logic circuitry.

As mentioned above, the microprocessor core 101 writes the data pointer indicating the start address of the first set of configuration data held in the data memory to the pointer register (not shown) which preferably is located in the controller state machine 307 via a separate and dedicated control interface 131 of the configuration controller 106. This dedicated control interface may for example comprise an industry standard type of Advanced Microcontroller Bus Architecture slave 305 (AMBA slave) or any other suitable data communications interface for on-chip data communication. The controller state machine 307 now proceeds by fetching the first set of configuration data for the first configurable math hardware accelerator HA1 from the pointer designated address space of the data memory 104 via the previously described data memory bus 130. This data memory bus 130 may also comprise an AMBA bus that is controlled by the memory bus master 301. The controller state machine 307 proceeds to access and fetch from a first configuration structure model circuit 309, the architectural details of the N configuration registers, N being a positive integer, of the first configurable math hardware accelerator HA1. These configuration registers are schematically depicted on FIG. 4 and the skilled person will appreciate that the number of individual registers, their size or bit-width and addressing may vary significantly depending on the specifics of its associated configurable math hardware accelerator. The first configuration structure model circuit 309 mimics the content of the previously discussed exemplary data structure declaration 201 of FIG. 2 and thereby informing the controller state machine 307 about the relevant configuration register details such as an register addresses, sizes, right/left justification of data etc. Based on these configuration register details, the controller state machine 307 is capable of translating the set of configuration data to a corresponding set of register level configuration data that fits the architectures of the N configuration registers.

The generation of respective register level configuration data for the second and third configurable math hardware accelerators HA2, HA3 by the controller state machine 307 proceeds in a similar manner but now with reference to the second and third configuration structure model circuits 311, 313.

The set of register level configuration data are written to the relevant registers of the first configurable math hardware accelerator HA1 via the dedicated data bus 135 via the control bus handler 303 that inter alia allows a plurality of configurable math hardware accelerators such as HA1-HA3 to be coupled to a common data bus or control bus. The control bus handler 303 may also be configured to interface the controller state machine 307 to different types of data busses utilized by the configurable math hardware accelerators HA1-HA3. This is particularly helpful where one or more of the configurable math hardware accelerators HA1-HA3 are reuse of pre-existing circuit designs and therefore built with different types of data busses. Some of such pre-existing configurable math hardware accelerators may for example comprise different types of proprietary data busses while another pre-existing math hardware accelerator may include an AMBA bus. The control bus handler 303 translates the set of configuration data for each of the configurable math hardware accelerators into the appropriate data bus format.

Figure 4:
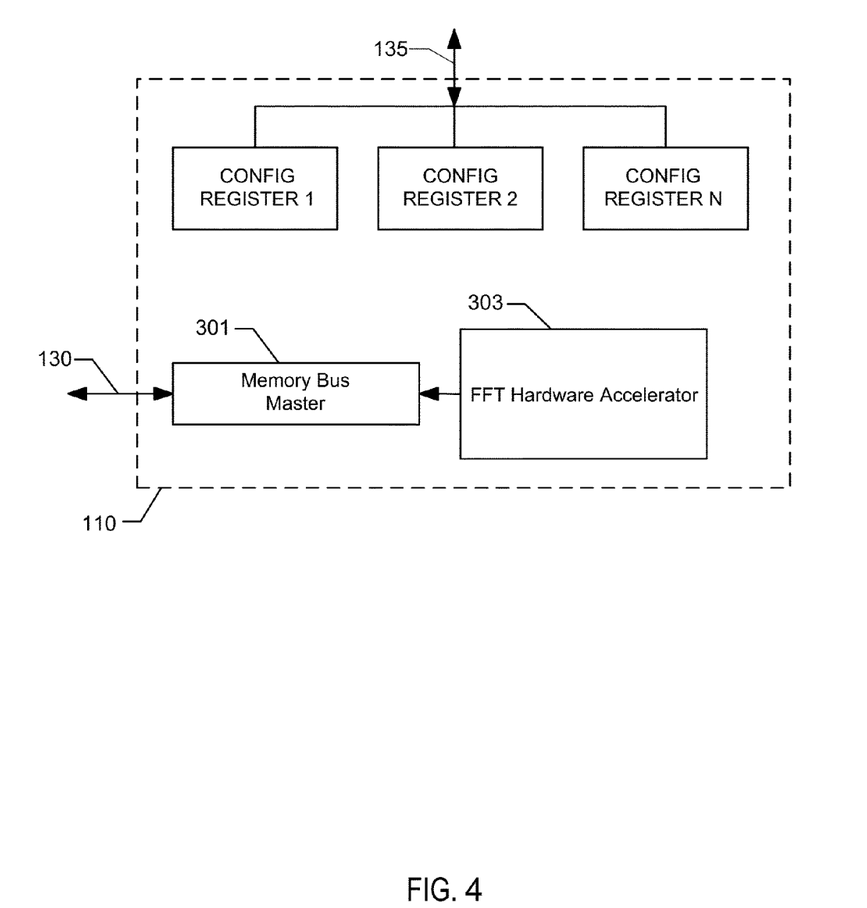
FIG. 4 is a simplified schematic block diagram of the internal structure of one of the configurable math hardware accelerators.

FIG. 4 is a simplified schematic block diagram of the internal structure of the first configurable math hardware accelerator 110. The configurable math hardware accelerator 110 comprises the previously discussed plurality of separately addressable configuration registers 1-N. The configuration controller 106 can write the appropriate register level configuration data to each of these configuration registers through the dedicated data bus 135 by selecting the appropriate register address. The plurality of configuration registers may comprise various types of writable volatile or non-volatile memory such as register files, RAM cells, EEPROM and flash memory etc. The plurality of configuration registers may be organized in different manners depending on various system and integration requirements. In one embodiment, the plurality of configuration registers are organized at consecutive addresses and may have identical size, e.g. 16 bits or 32 bits, such that the computational effort involved in writing the register level data is minimized. However, in other embodiments, the plurality of configuration registers may be located at non-consecutive addresses and may have different sizes and formats.

The first configurable math hardware accelerator 110 also comprise a dedicated or hardware implemented FFT computational engine/accelerator/co-processor 303 that computes FFTs of the designated audio input samples or data in a highly efficient manner in accordance with register level data loaded into the plurality of configuration registers. The first configurable math hardware accelerator 110 additionally comprises a data communication port of interface connecting the FFT accelerator 303 to the data memory bus 130 allowing the FFT accelerator 303 to load the appropriate set of input data to be transformed. The FFT accelerator 303 is capable of determining the proper data memory address space from the previously discussed variable Int32 iBuf data pointer that is now loaded into a specific 32 bit configuration register of the first configurable math hardware accelerator 110 as specified by the first configuration structure model circuit 309.

The invention claimed is:

1. An apparatus comprising:
a microprocessor core;
a hardware accelerator including a configuration register and configurable by contents of the configuration register to apply a predetermined signal processing function upon input operand data; and
a configuration controller comprising a predetermined data-structure specification and a configuration model, the predetermined data-structure specification including one or more data structures, the configuration model including one or more structural details of the configuration register, and the configuration controller being responsive to a notification from the microprocessor core to configure the contents of the configuration register of the hardware accelerator by a translation of configuration data from a first format associated with the predetermined data-structure specification to a second format associated with the configuration model.

2. The apparatus of claim 1, wherein the configuration controller comprises a pointer register for a data pointer indicating a location of the configuration data in memory.

3. The apparatus of claim 1, wherein the notification from the microprocessor core includes a data pointer indicating a location of the configuration data in memory.

4. The apparatus of claim 1, wherein the hardware accelerator is configured to apply a part of a predetermined signal processing method upon the input operand data.

5. The apparatus of claim 1, wherein the configuration controller is further configured to transfer the input operand data from memory to an input data register of the hardware accelerator.

6. The apparatus of claim 1, wherein the hardware accelerator is further configured to transfer the input operand data from memory to an input data register of the hardware accelerator.

7. An integrated semiconductor die comprising the apparatus of claim 1.

8. The apparatus of claim 1, wherein the hardware accelerator is configured to select the predetermined signal processing function from a group of fast Fourier transform (FFT), inverse FFT (iFFT), vector*matrix multiplication, finite impulse response (FIR) filter, infinite impulse response (IIR) filter, logarithm, and square root.

9. The apparatus of claim 1, wherein
the notification from the microprocessor core identifies the configuration data at a location in memory, the configuration data being structured at the location in memory in the first format in accordance with the predetermined data-structure specification; and
the configuration controller is configured to fetch the configuration data in the first format from the memory.

10. The apparatus of claim 9, wherein the configuration controller is configured to perform operations including:
translating the configuration data in the first format into register-level configuration data in the second format in accordance with the predetermined data-structure specification and the configuration model; and
transferring the register-level configuration data to the configuration register of the hardware accelerator.

11. The apparatus of claim 1, wherein the apparatus comprises a plurality of hardware accelerators, each hardware accelerator of the plurality of hardware accelerators including a corresponding configuration register and being configurable by contents of the corresponding configuration register to apply a corresponding predetermined signal processing function upon input operand data; and
the configuration controller is configured to select the hardware accelerator from the plurality of hardware accelerators in accordance with the notification from the microprocessor core.

12. The apparatus of claim 1, wherein the configuration model is based on an architecture of the configuration register.

13. The apparatus of claim 1, wherein
the one or more data structures include high-level-language data structures; and
and the one or more structural details include register addresses and register sizes.

14. A method, comprising:
responsive to a notification from a microprocessor core, configuring, by a configuration controller comprising a predetermined data-structure specification and a configuration model, contents of a configuration register included in a hardware accelerator, the predetermined data-structure specification including one or more data structures, the configuration model including one or more structural details of the configuration register, and the contents of the configuration register being configured by a translation of configuration data from a first format associated with the predetermined data-structure specification to a second format associated with the configuration model; and performing, by the hardware accelerator, a processing operation on input operand data, wherein operation of the hardware accelerator is determined by the contents of the configuration register.

15. The method of claim 14, wherein the configuration data is identified by a data pointer included in the notification and indicating a location of the configuration data in memory.

16. The method of claim 14, further comprising:
compiling source code comprising high-level language declarations of the predetermined data-structure specification to generate the configuration data in the first format; and
loading the configuration data into respective predetermined address spaces of memory.

17. The method of claim 14, further comprising:
identifying the configuration data at a location in memory, the configuration data being structured at the location in memory in the first format in accordance with the predetermined data-structure specification; and
fetching, by the configuration controller, the configuration data in the first format from the memory.

18. The method of claim 17, comprising:
translating, by the configuration controller, the configuration data in the first format into register-level configuration data in the second format in accordance with the predetermined data-structure specification and the configuration model; and
transferring, by the configuration controller, the register-level configuration data to the configuration register of the hardware accelerator.

19. The method of claim 14, wherein the configuration data is identified by a data pointer included in a pointer register of the configuration controller and indicating a location of the configuration data in memory.

20. An apparatus comprising:
a microprocessor core;
a hardware accelerator including a configuration register and configurable by contents of the configuration register to apply a predetermined signal processing function upon input operand data; and
means for configuring the contents of the configuration register of the hardware accelerator in response to a notification from the microprocessor core, the contents of the configuration register being configured by a translation of configuration data from a first format associated with a predetermined data-structure specification that includes one or more data structures to a second format associated with a configuration model that includes one or more structural details of the configuration register.

* * * * *